(12) United States Patent
Hwang et al.

(10) Patent No.: US 8,307,183 B2
(45) Date of Patent: Nov. 6, 2012

(54) RECORDING/REPRODUCING METHOD, RECORDING/REPRODUCING APPARATUS AND INFORMATION STORAGE MEDIUM

(75) Inventors: Sung-hee Hwang, Suwon-si (KR); Joon-hwan Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 11/936,943

(22) Filed: Nov. 8, 2007

(65) Prior Publication Data

US 2008/0112292 A1  May 15, 2008

(30) Foreign Application Priority Data

Nov. 10, 2006 (KR) .................. 10-2006-0111234

(51) Int. Cl.
*G06F 12/00* (2006.01)
(52) U.S. Cl. ........ 711/170; 711/173; 711/202; 711/203; 711/204; 711/205; 711/206
(58) Field of Classification Search ................ 711/202, 711/203, 204, 205, 206
See application file for complete search history.

(56) References Cited

U.S. PATENT DOCUMENTS

| | | | |
|---|---|---|---|
| 2004/0062160 A1 | 4/2004 | Park et al. | |
| 2004/0264361 A1* | 12/2004 | Kondo | 369/275.5 |
| 2005/0060489 A1* | 3/2005 | Park | 711/112 |
| 2005/0083815 A1* | 4/2005 | Park | 369/53.15 |
| 2005/0219979 A1 | 10/2005 | Terada et al. | |
| 2005/0270946 A1 | 12/2005 | Kim | |
| 2006/0044979 A1 | 3/2006 | Kuraoka et al. | |
| 2006/0087943 A1 | 4/2006 | Kuraoka et al. | |
| 2007/0014200 A1 | 1/2007 | Yoshida et al. | |

FOREIGN PATENT DOCUMENTS

| | | |
|---|---|---|
| CN | 1754220 | 3/2006 |
| EP | 1628302 A2 | 2/2006 |
| JP | 2006-114107 A | 4/2006 |
| JP | 2006-512699 A | 4/2006 |
| JP | 2009-536162 | 10/2009 |

(Continued)

OTHER PUBLICATIONS

Search Report issued on Feb. 19, 2008 by the International Searching Authority for International Patent Application No. PCT/KR2007/005601.

(Continued)

*Primary Examiner* — Kevin Ellis
*Assistant Examiner* — Gurtej Bansal
(74) *Attorney, Agent, or Firm* — NSIP Law

(57) ABSTRACT

A recording and/or reproducing method, a recording and/or reproducing apparatus, and an information storage medium are provided. The method of recording data to an information storage medium includes: according to a change in a method of using the information storage medium, rearranging the order of a first information structure with a variable size and a second information structure with a fixed size, both of which are included in management information of the information storage medium, so that the first information structure with the variable size can be positioned following the second information structure with the fixed size; and recording the rearranged management information on the information storage medium. According to the method and apparatus, recording management information can be found in a fixed location of a finalized information storage medium, thereby allowing the recording management information to be found easily and quickly.

4 Claims, 10 Drawing Sheets

FOREIGN PATENT DOCUMENTS

| WO | WO 2004/034396 | | 4/2004 |
|---|---|---|---|
| WO | WO 2004/059648 | | 7/2004 |
| WO | WO 2004/059648 | A2 | 7/2004 |
| WO | WO 2004/077415 | | 9/2004 |
| WO | WO 2004/077415 | A1 | 9/2004 |
| WO | WO 2005/006314 | A1 | 1/2005 |
| WO | WO 2005/038779 | A2 | 4/2005 |
| WO | WO 2005/091291 | A1 | 9/2005 |
| WO | WO 2007-128066 | A1 | 11/2007 |

OTHER PUBLICATIONS

Office Action issued in corresponding European Patent Application No. 07120190.9 dated May 7, 2008.
Anonymous, "White paper Blu-ray Disc Format, 1.B Physical Format Specifications for BD-R", Blu-ray Disc Founders, Aug. 2004, pp. 1-33.
Chinese Office Action issued on Aug. 12, 2010, in corresponding Chinese Patent Application No. 200780041727.2 (8 pages).
Mexican Office issued on Jun. 29, 2011, in counterpart Mexican Patent Application No. MX/a/2009/004941 (4 pages, including English translation).
Taiwanese Office Action issued on Aug. 17, 2011, in counterpart Taiwanese Patent Application No. 096142182 (6 pages including English translation).
Taiwanese Office Action issued on Mar. 24, 2011, in corresponding Taiwanese Patent Application No. 096142182 (17 pages).
Australian Office Action issued on Mar. 28, 2011, in corresponding Australian Patent Application No. 2007318358 (4 pages).
Office Action issued on Jan. 5, 2012 of the Mexican Patent Application No. MX/a/2009/004941.
Office Action issued on Feb. 21, 2012 of the Japanese Patent Application No. 2011-14228.
European Summons to attend oral proceedings pursuant to Rule 115(1) EPC issued Nov. 30, 2011, in counterpart European Application No. 07120190.9 5 pp.
Extended European Search Report issued Dec. 2, 2011, in counterpart European Application No. 10193881.9, 9 pp.
Japanese Office Action issued Oct. 4, 2011, in counterpart Japanese Application No. 2009-536162, 1 pg.
Japanese Office Action issued Nov. 1, 2011, in counterpart Japanese Application No. 2011-014228, 2 pp.
"White Paper Blu-ray Disc Format: 1.B Physical Format Specifications for BD-R", Blu-ray Disc Founders, Aug. 2004, 34 pp, XP-002324152.
Examination Report issued on Jul. 27, 2012, in counterpart European Patent Application No. 07120190.9 (3pp, in English).

* cited by examiner

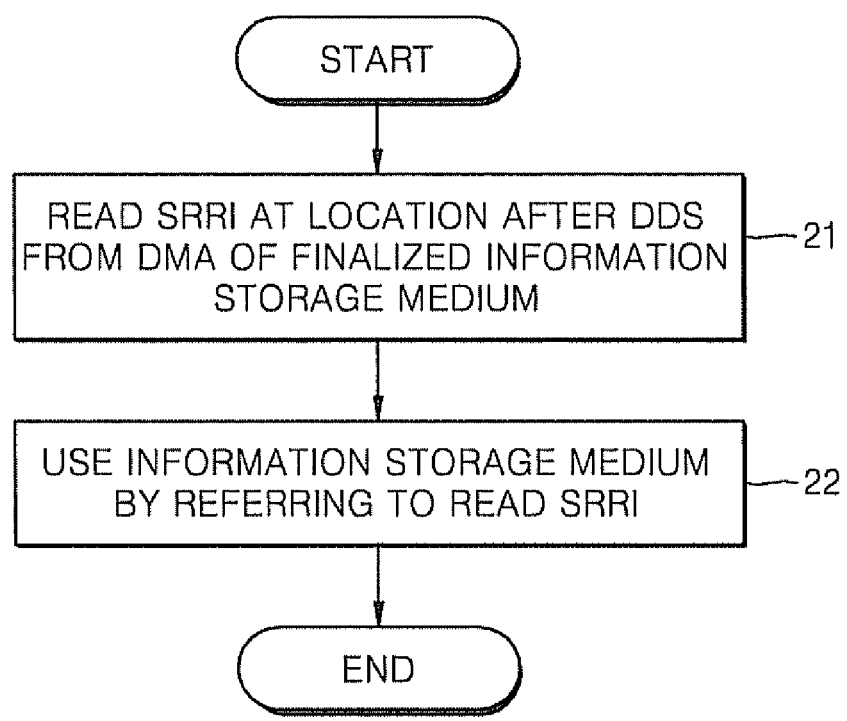

RECORDING/REPRODUCING METHOD, RECORDING/REPRODUCING APPARATUS AND INFORMATION STORAGE MEDIUM

CROSS-REFERENCE TO RELATED APPLICATION

This application claims the benefit of Korean Patent Application No. 2006-111234, filed Nov. 10, 2006 in the Korean Intellectual Property Office, the disclosure of which is incorporated herein by reference.

BACKGROUND OF THE INVENTION

1. Field of the Invention

Aspects of the present invention relates to an information storage medium, and more particularly, to a recording and/or reproducing method, and a recording and/or reproducing apparatus allowing recording management information to be easily retrieved from an information storage medium, and an information storage medium therefor.

2. Description of the Related Art

A Blue-ray disc recordable (BD-R) disc has a recording function which can replace a defect on the disc with a normal recording area. This function is referred to as a defect management function. Also, a user data area of the disc can be divided into a plurality of sequential recording ranges (SRRs). In each SRR, incremental recording can be performed and this incremental recording mode is referred to as a sequential recording mode (SRM). Further, a write command of a host in relation to an area in which data has been already recorded can instead be redirected to an area in which no data has been recorded. This function is referred to as a logical overwrite (LOW). These information items required for overall usage and management of the disc are stored in a place which is referred to as a temporary disc management area (TDMA). The TDMA is assigned and used in a lead-in area on the disc. Additionally, a part of a spare area in a user data area can be allocated and used as a TDMA. Accordingly, a plurality of TDMA areas can be allocated on a disc.

TDMA information is divided into a temporary disc definition structure (TDDS), a temporary defect list (TDFL), and sequential recording range information (SRRI). Since a plurality of TDMA areas can be allocated, an access information area (ATDMA) is additionally required in order to easily and quickly find location information on a location in which a final TDMA is recorded.

The TDDS includes information on the size and location of an allocated spare area, and location information on locations in which the SRRI and TDFL are recorded. The TDFL includes replacement information by LOW, information on a defect which is found while the disc is used, and replacement information in relation to the defect. The SRRI includes SRR information in relation to sequential recording.

In the case of an information storage medium for recording, while the information storage medium is used for recording data, if a user only desires to use the information storage medium for reproduction without further recording data on the medium, then, the information storage medium is finalized. When the information storage medium is finalized, final recording management information is copied from recording management information which was temporarily recorded, and is recorded into a predetermined area. In this case, unless management of the final recording management information is performed well, it may become difficult to easily find the final recording management information in the finalized information storage medium.

SUMMARY OF THE INVENTION

Aspects of the present invention provide a recording and/or reproducing method, and a recording and/or reproducing apparatus allowing recording management information to be easily found in an information storage medium, and an information storage medium therefor.

According to an aspect of the present invention, there is provided a recording method of recording data on an information storage medium, the method including: rearranging an order of a first information structure with a variable size and a second information structure with a fixed size, both of which being included in management information of the information storage medium, so that the first information structure with the variable size can be positioned following the second information structure with the fixed size; and recording the rearranged management information on the information storage medium.

According to an aspect of the present invention, the first information structure may be recording management information, and the second information structure may include location information of the first information structure.

According to an aspect of the invention, the rearranging is performed according to a change in a method of using the information storage medium.

According to an aspect of the invention, the change in the method of using the information storage medium may mean finalization of the information storage medium.

According to an aspect of the invention, the recording of the rearranged management information may include recording the rearranged management information in an area for recording final management information of the information storage medium.

According to another aspect of the present invention, there is provided a recording method of recording data on an information storage medium, the method including: according to finalization of the information storage medium, rearranging the order of sequential recording range information (SRRI) with a variable size and a temporary disc definition structure (TDDS) with a fixed size, both included in a temporary disc management structure (TDMS) of the information storage medium, so that the SRRI with the variable size can be positioned following the TDDS with the fixed size; and recording the rearranged TDMS in a disc management area (DMA) of the information storage medium.

According to another aspect of the present invention, there is provided a recording apparatus for recording data on an information storage medium, the apparatus including: a recording/reading unit recording data on or reading data from the information storage medium; and a control unit controlling the recording/reading unit to rearrange an order of a first information structure with a variable size and a second information structure with a fixed size, both of which being included in management information of the information storage medium, so that the first information structure with the variable size can be positioned following the second information structure with the fixed size, and to record the rearranged management information on the information storage medium.

According to another aspect of the present invention, there is provided an apparatus for recording data on an information storage medium, the apparatus including: a recording/reading unit recording data on or reading data from the information storage medium; and a control unit controlling the recording/reading unit so that according to finalization of the information storage medium, an order of SRRI with a variable size and a TDDS with a fixed size, both of which being included in a TDMS of the information storage medium, is rearranged so that the SRRI with the variable size can be positioned following the TDDS with the fixed size, and the rearranged TDMS is recorded in a DMA on the information storage medium.

According to another aspect of the present invention, there is provided a method of reproducing data from a finalized information storage medium, the method including: reading SRRI from a location following a TDDS with a fixed size, in a DMA of the information storage medium; and reproducing data by using the read SRRI.

According to another aspect of the present invention, there is provided an apparatus for reproducing data from a finalized information storage medium, the apparatus including: a reading unit reading data from the information storage medium; and a control unit controlling the reading unit SRRI from a location following a TDDS with a fixed size in a DMA of the information storage medium, and by using the read SRRI, controlling reproduction of data.

According to another aspect of the present invention, there is provided an information storage medium including an area for recording management information in which, an order of a first information structure with a variable size and a second information structure with a fixed size, both of which being included in management information of the information storage medium, is rearranged so that the first information structure with the variable size can be positioned following the second information structure with the fixed size.

According to another aspect of the present invention, there is provided an information storage medium including a DMA for recording a TDMS in which according to finalization of the information storage medium, an order of SRRI with a variable size and a TDDS with a fixed size, both of which being included in the TDMS of the information storage medium, is rearranged so that the SRRI with the variable size can be positioned following the TDDS with the fixed size.

According to another aspect of the present invention, there is provided a method of recording data on an information storage medium including recording SRRI in a data frame following a data frame in which a DDS is finally recorded in a DMA of the information storage medium.

According to an aspect of the invention, the method may further include recording meaningless data in data frames which remain after the DDS and the SRRI is recorded in the DMA.

According to another aspect of the present invention, there is provided an apparatus for recording data on an information storage medium including: a recording/reading unit recording data on or reading data from the information storage medium; and a control unit controlling the recording/reading unit so that SRRI can be recorded in from a data frame following a data frame in which a DDS is finally recorded in a DMA of the information storage medium.

According to an aspect of the invention, the control unit may further control the recording/reading unit so that meaningless data can be recorded in data frames which remain after the DDS and the SRRI is recorded in the DMA.

According to another aspect of the present invention, there is provided an information storage medium including a DMA in which SRRI is recorded in a data frame following a data frame in which a DDS is finally recorded.

According to an aspect of the invention, in the information storage medium, meaningless data may be recorded in data frames which remain after the DDS and the SRRI is recorded in the DMA.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 12 is a flowchart illustrating operations of a method of reproducing data according to an embodiment of the present invention.

DETAILED DESCRIPTION OF THE EMBODIMENTS

Figure 1:
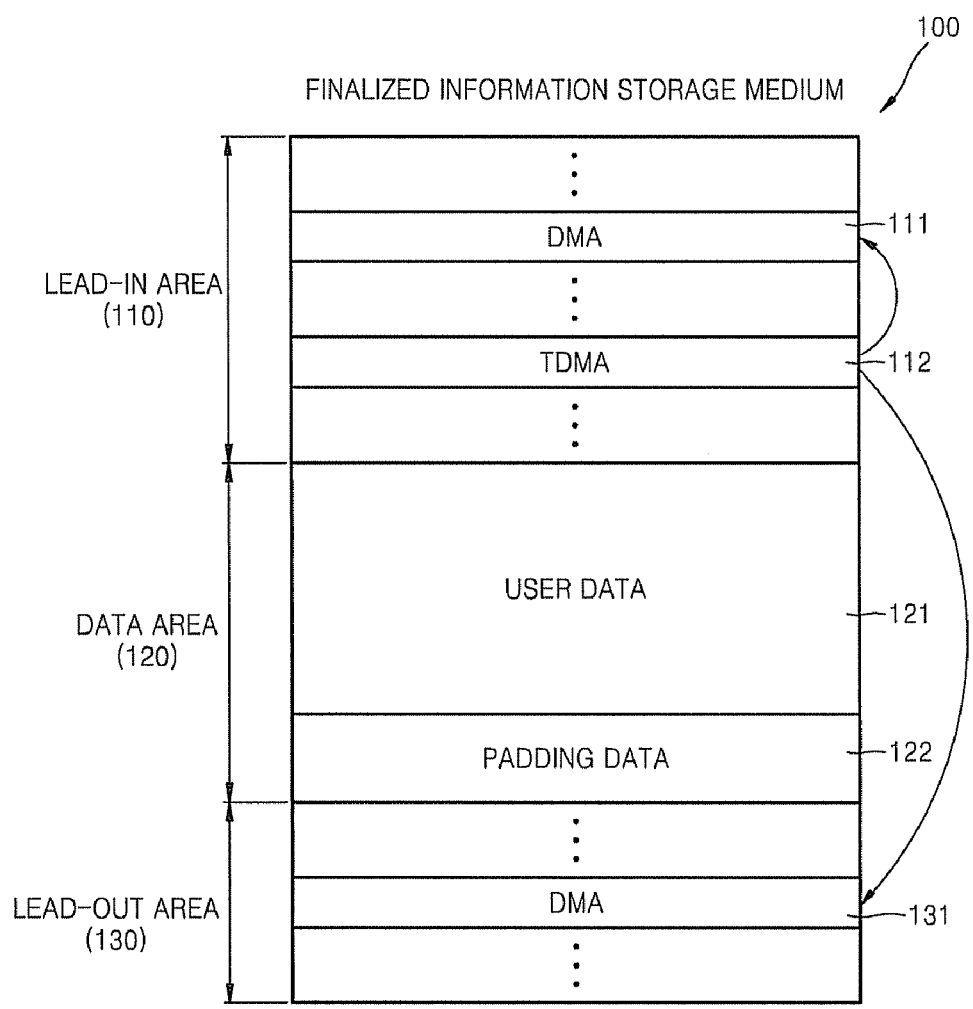
FIG. 1 is a diagram illustrating an example of a finalized information storage medium according to conventional technology.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an example of a finalized information storage medium. Referring to FIG. 1, the finalized information storage medium 100 includes a lead-in area 110, a data area 120, and a lead-out area 130. In the data area 120, user data 121 is recorded. In the lead-in area 110 and the lead-out area 130, information on data recording management or defect management, and disc management information is recorded. While not required in all aspects, the medium 100 can be a write once disc, such as a BD-R or a write-once HD-DVD, but is not limited thereto. Aspects of the invention can be applied to rewriteable media as well as to non-optical media, such as magnetic media.

While the information storage medium 100 is used by recording user data in the data area 120, if a user does not want to record data any more and wants to use the information storage medium only for reproduction of data (that is, the information storage medium is desired to be used only for reproduction without further recording data on the medium), then the user performs finalization of the information storage medium 100.

There may be a variety of methods of finalizing an information storage medium. A method will now be explained with reference to the example illustrated in FIG. 1. In order to prevent data from being recorded further on the data area 120, the remaining area in the data area 120 where user data 121 has not been recorded is filled with predetermined padding data 122. Then, a final temporary disc management structure (TDMS) among TDMSs recorded in a temporary disc management area (TDMA) 112 is copied into a disc management area (DMA) 111 and 131. The remaining TDMSs relate to defects occurring during recording operations prior to a last recording operation prior to finalization. Hereinafter, the TDMS copied into the DMA 111 and 131 will be referred to as a disc management structure (DMS). When data is reproduced from the thus finalized information storage medium 100 in the future, the DMS is read from the DMA 111 and 131, and by referring to the read DMS, data is reproduced from the information storage medium 100. While not required in all aspects, the DMA and the TDMA can be referred to as or include a Defect Management Area and a Temporary Defect Management Area, respectively.

As described above, a TDMS includes a temporary disc definition structure (TDDS), a temporary defect list (TDFL), and sequential recording range information (SRRI). The TDMS is recorded in the TDMA 112. Then, the TDDS, the TDFL, and the SRRI are updated in predetermined units as data is recorded to the information storage medium 100. For example, three types of units for updating the TDMS may be considered. A first TDMS update unit includes all of the TDFL, the SRRI, and the TDDS. A second TDMS update unit includes the SRRI and the TDDS. A third TDMS update unit includes the TDFL and the TDDS.

Figure 2:
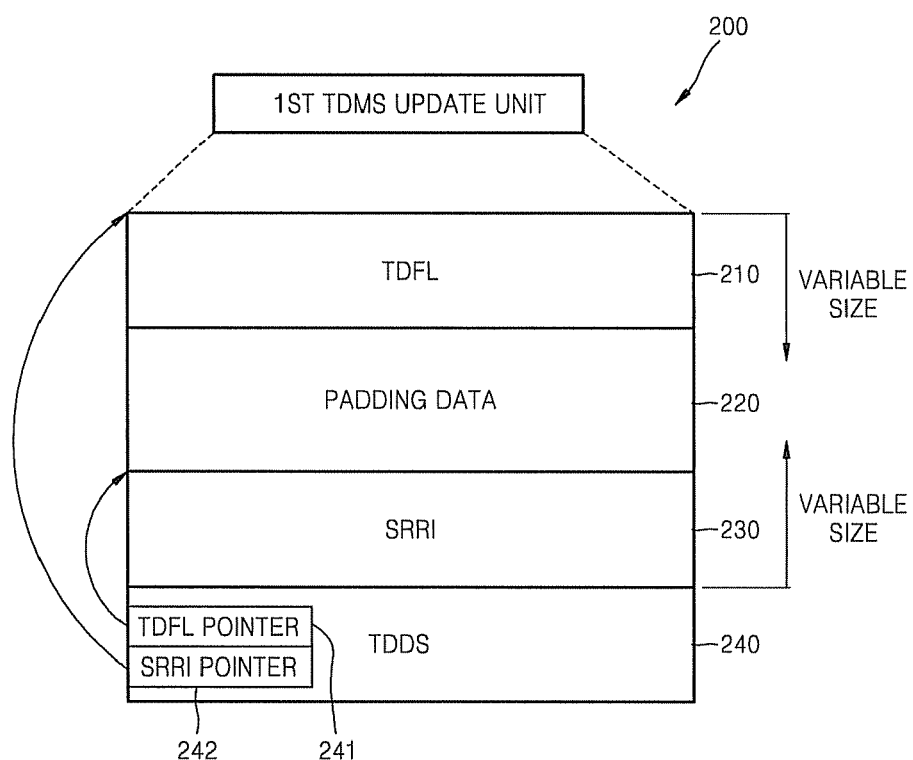
FIG. 2 is a diagram illustrating an example of a temporary disc management structure (TDMS) update unit according to conventional technology.

FIG. 2 is a diagram illustrating an example of the first TDMS update unit. Referring to FIG. 2, the first TDMS update unit 200 includes a TDFL 210, padding data 220, SRRI 230, and a TDDS 240. The TDFL 210 includes defect information, and the SRRI 230 includes recording management information. According to the amount of defects detected in an information storage medium or the information required for recording management, the sizes of the TDFL 210 and the SRRI 230 may be made to be variable. In a method of flexibly setting the sizes of the TDFL 210 and the SRRI 230, both having variable sizes, information in the TDFL 210 is recorded from the farther end of the TDFL 210 from the SRRI 230 towards the SRRI 230, and information in the SRRI 230 is recorded from the farther end of the SRRI 230 towards the TDFL 210 as illustrated in FIG. 2. If the amount of data is insufficient, the padding data 220 is used to fill the gap between the TDFL 210 and the SRRI 230. As such, the padding data 220 need not be used in all aspects.

The remaining part in which data is not recorded between the TDFL 210 and the SRRI 230 is filled with padding data 220. The TDDS 240 includes disc definition information. In particular, because the sizes of the TDFL 210 and the SRRI 230 are variable, the TDDS 240 has a TDFL pointer 242 and an SRRI pointer 241 which indicate the start addresses of the TDFL 210 and the SRRI 230, respectively. The TDDS 240 has a fixed size. In this way, the TDFL 210 and the SRRI 240 with variable sizes and the TDDS 240 with a fixed size are included in one update unit in an ordered arrangement of information structures, i.e., the TDFL 210, the SRRI 230, and the TDDS 240, in which the information structures are arranged in order of the TDFL 210, the padding data 220, the SRRI 230, and the TDDS 240.

Figure 3A:
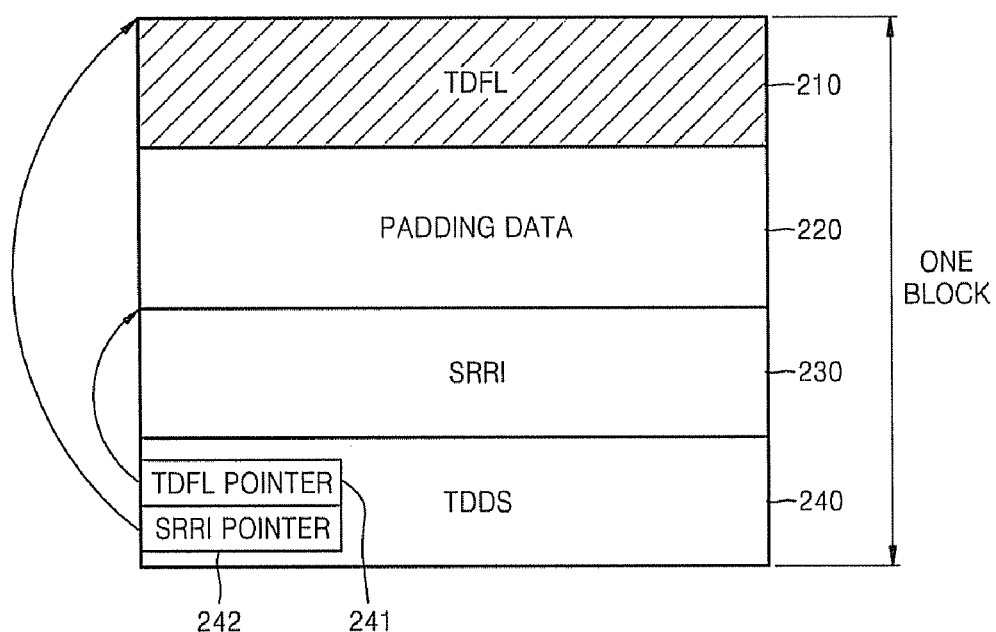
FIG. 3A is a diagram illustrating an example in which the TDMS update unit illustrated in FIG. 2 is formed of one block according to conventional technology.
Figure 3B:
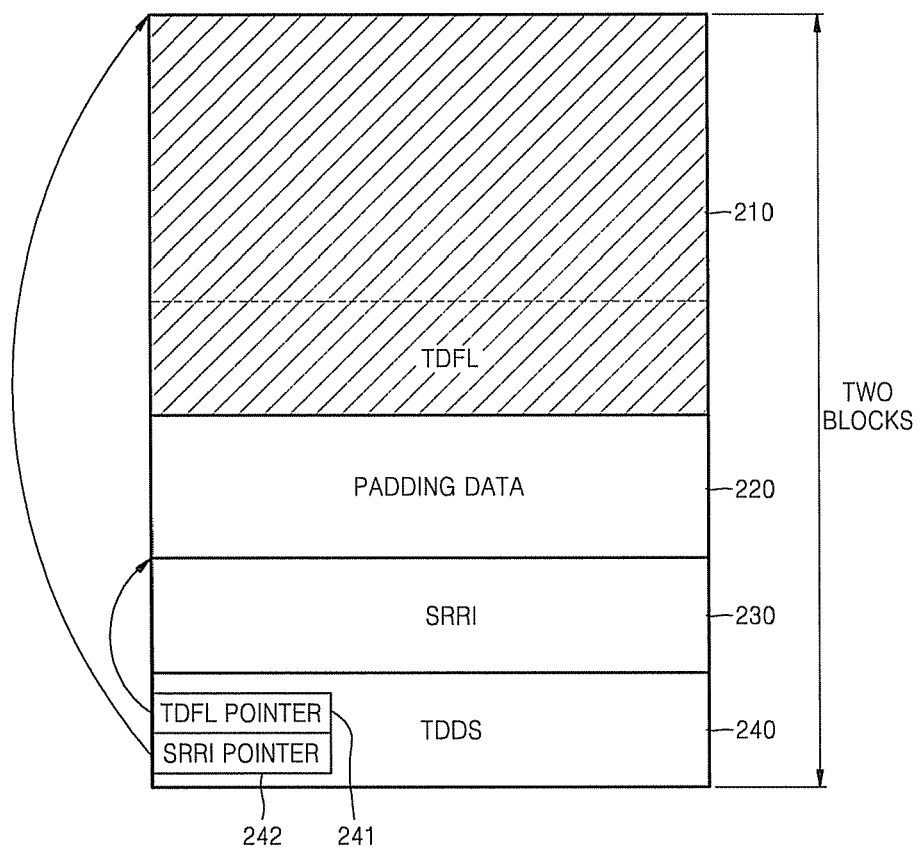
FIG. 3B is a diagram illustrating an example in which the TDMS update unit illustrated in FIG. 2 is formed of two blocks according to conventional technology.

FIG. 3A is a diagram illustrating an example in which the first TDMS update unit 200 illustrated in FIG. 2 is formed of one block. When the first TDMS update unit 200 can be recorded as one block, the first TDMS update unit 200 can have a shape as illustrated in FIG. 3A. When the first TDMS update unit 200 is recorded as more than one block, the first TDMS update unit 200 can have a shape as illustrated in FIG. 3B by using two blocks. In each case, the start locations of the TDFL 210 and the SRRI 230 are different, and therefore the TDDS 240 includes the SRRI pointer 241 and the TDFL pointer 242.

Figure 4:
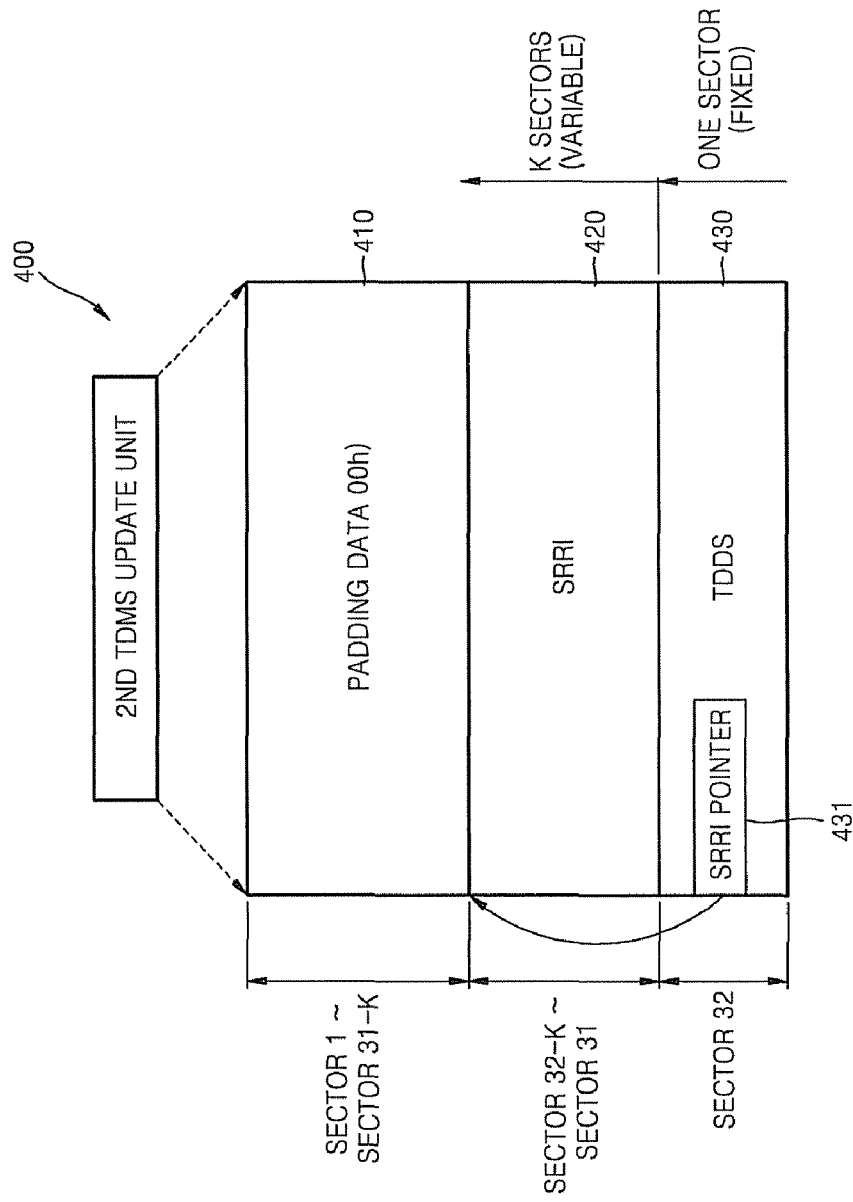
FIG. 4 is a diagram illustrating another example of a TDMS update unit according to conventional technology.

FIG. 4 is a diagram illustrating another example of a second TDMS update unit 400. Referring to FIG. 4, the second TDMS update unit 400 includes padding data 410, SRRI 420, and a TDDS 430. The TDDS 430 is formed as a fixed size of one sector, and includes an SRRI pointer 431 indicating the start address of the SRRI 420. The SRRI 420 is formed in a variable size of K sectors. In the second TDMS update unit 400, the remaining part which is not recorded as the SRRI 420 is filled with padding data 410. In order to correspond to the structure of the first TDMS update unit 200 illustrated in FIG. 2, the SRRI 420 is arranged adjacent to the location of the TDDS 430. If the amount of data is insufficient, the padding data 410 is used to fill the gap. However, it is understood that the padding data 410 need not be used in all aspects.

Figure 5:
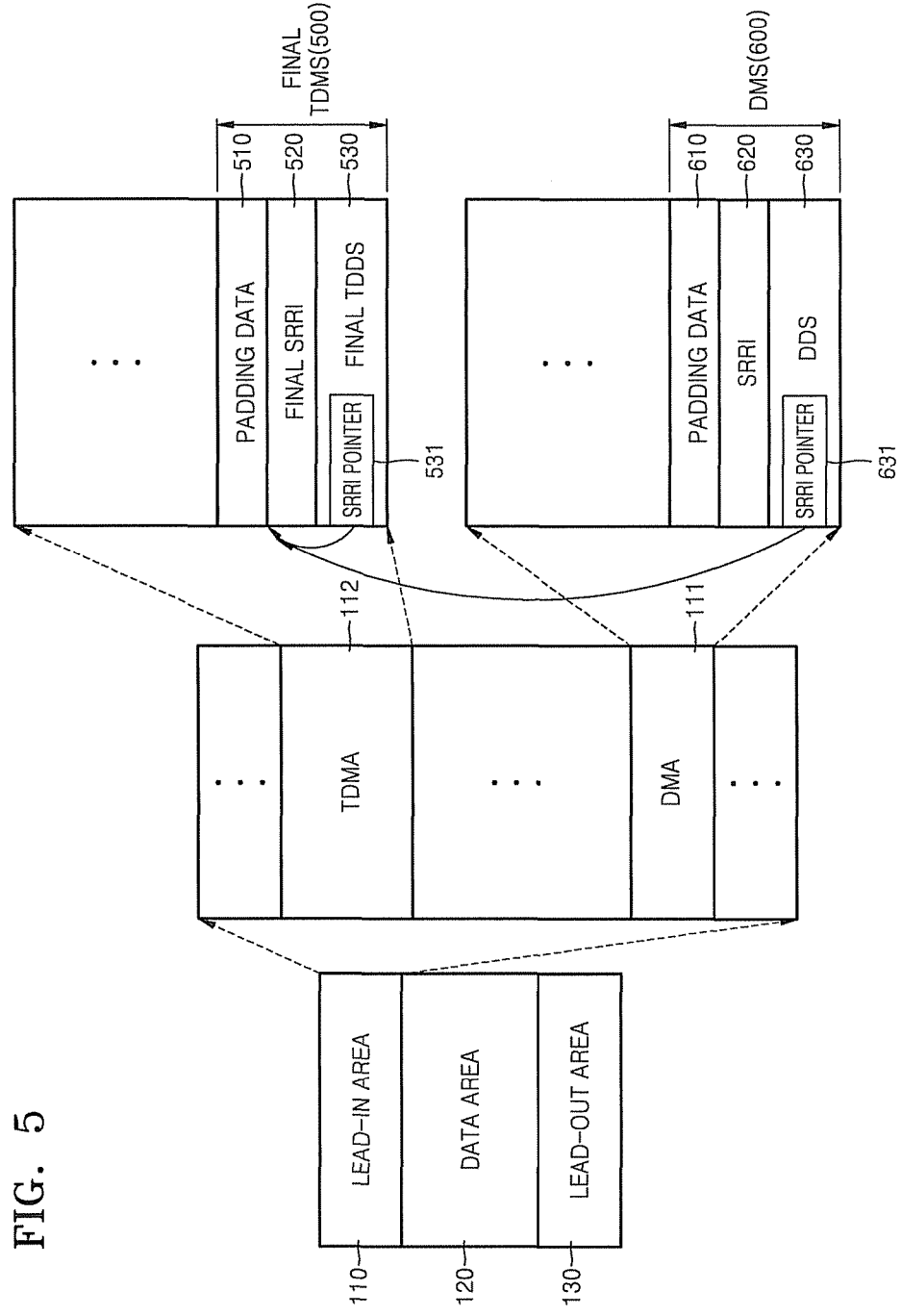
FIG. 5 is a reference diagram illustrating a concept of copying a final TDMS into a disc management area (DMA) according to conventional technology.

Copying of a final TDMS having the shape of the second TDMS update unit 400 illustrated in FIG. 4, into a DMA 111 or 131 when an information storage medium is finalized will now be explained. FIG. 5 is a reference diagram illustrating a concept of copying a final TDMS into a DMA 111 or 131.

Referring to FIG. 5, a final TDMS 500 recorded in a TDMA 112 is formed with padding data 510, final SRRI 520, and a final TDDS 530. Since the final TDDS 530 includes an SRRI pointer 531 indicating the start address of the final SRRI 520, the start address of the final SRRI 520 can be found by using the final TDDS 530. When this information storage medium is finalized, the final TDMS 500 in the TDMA 112 is copied into a DMA 111. The final TDMS copied into the DMA 111 will be referred to as a DMS 600. That is, the padding data 510, the final SRRI 520, and the final TDDS 530 of the final TDMS 500 are copied as the padding data 610, the SRRI 620, and the DDS 630, respectively, of the DMS 600. If the amount of data is insufficient, the padding data 510 is used to fill the gap. However, it is understood that the padding data 510 need not be used in all aspects.

Figure 6:
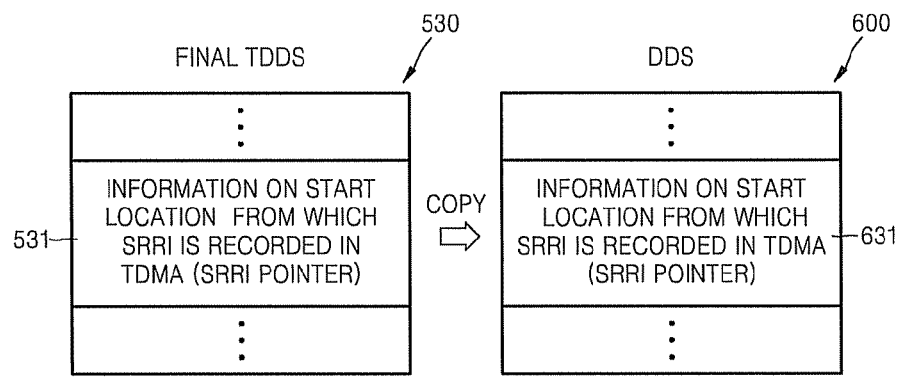
FIG. 6 is a diagram illustrating the contents of a final temporary disc definition structure (TDDS) and a disc definition structure (DDS) after a final TDMS is copied into a DMA according to conventional technology.

Referring to FIG. 6, the DMS 600 in the DMA 111 has the exact same contents as those of the final TDMS 500. Accordingly, the SRRI pointer 631 in the DDS 630 included in the DMS 600 indicates only the start address of the final SRRI 520 included in the final TDMS 500, but cannot indicate the start address of the SRRI 620 included in the DMS 600. Accordingly, the start address of the SRRI 620 of the DMS 600 cannot be found.

In order to solve this problem, according to an aspect of the present invention, when a final TDMS 500 recorded in a TDMA 112 is copied into a DMA 111 during finalization of an information storage medium 100, the TDMS 500 is not directly copied into the DMS 600. Instead, after rearranging the information structures included in the TDMS 500, the TDMS is then copied into the DMS 600.

Figure 7:
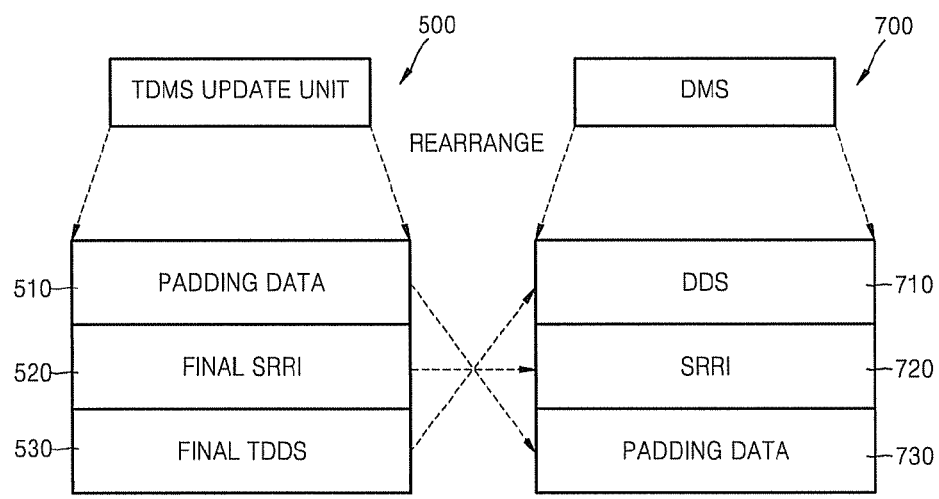
FIG. 7 is a reference diagram illustrating a concept of copying a final TDMS into a disc management structure (DMS) according to an embodiment of the present invention.

FIG. 7 is a reference diagram illustrating a concept of copying a final TDMS 500 into a DMS 700 according to an embodiment of the present invention. Referring to FIG. 7, when a final TDMS 500 is copied into a DMS 700, a final TDDS 530 with a fixed size is copied as a DDS 710 in the first location in the DMS 700. A final SRRI 520 with a variable size is arranged at a location following the DDS 710, and followed by padding data 730. That is, the SRRI 720 begins to be recorded in a data frame following a data frame in which the DDS 710 is finally recorded in the DMA 112 of the information storage medium 100, and meaningless data (i.e., the padding data 730) is recorded in the remaining data frames after recording the DDS 710 and the SRRI 720. Thus, by arranging the SRRI 720 with a variable size following the DDS 710 with a fixed size, it can be known even without referring to an SRRI pointer included in the DDS 710, that the SRRI 720 begins from a fixed location (i.e., after a sector which is the fixed size of the DDS 710).

Figure 8:
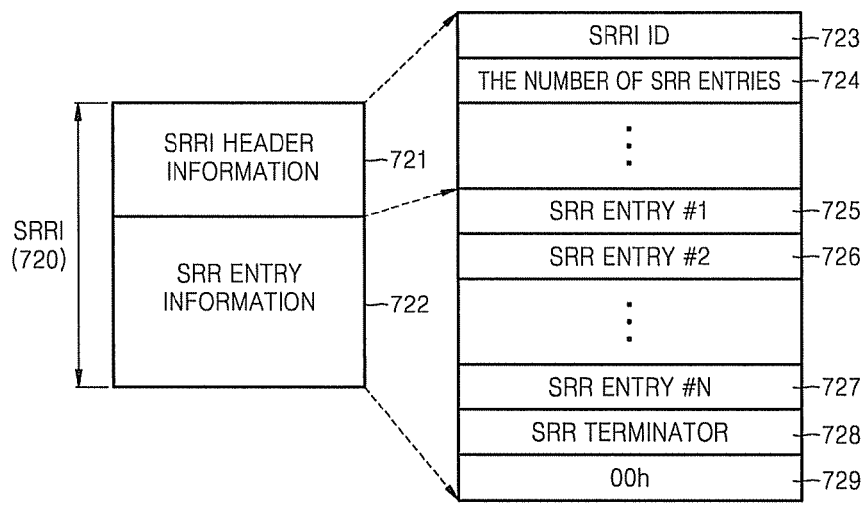
FIG. 8 is a diagram illustrating the contents of sequential recording range information (SRRI) illustrated in FIG. 7 according to an embodiment of the present invention.

FIG. 8 is a diagram illustrating the contents of SRRI 720 illustrated in FIG. 7 according to an embodiment of the present invention. Referring to FIG. 8, the SRRI 720 includes SRRI header information 721 and SRR entry information 722. The SRR header information 721 includes an SRRI ID 723 for identifying SRRI, and the number of SRR entries 724. The SRR entry information 722 includes SRR entry #1 725, SRR entry #2 726, through to SRR entry #N 727, an SRR terminator 728, and 00 h 729.

Figure 9:
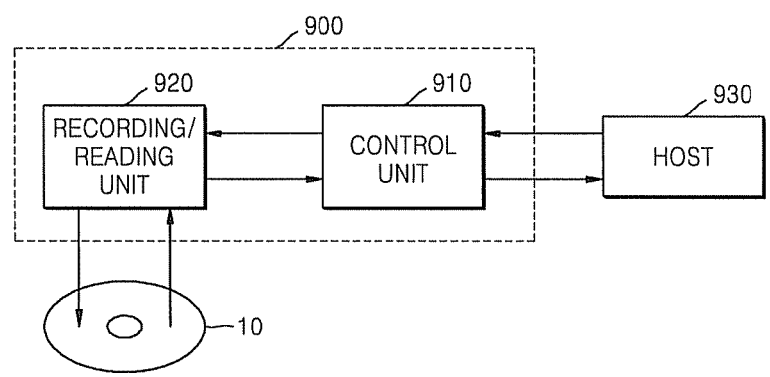
FIG. 9 is a schematic diagram illustrating a structure of a recording and/or reproducing apparatus according to an embodiment of the present invention.

FIG. 9 is a schematic diagram illustrating a structure of a recording and/or reproducing apparatus 900 according to an embodiment of the present invention. Referring to FIG. 9, the recording and/or reproducing apparatus 900 can record data on or reproduce data from an information storage medium 10, and includes a recording/reading unit 920 and a control unit 910. According to control of the control unit 910, the recording/reading unit 920 records data on the disc 10 (that is, an information storage medium according to the present invention), and reads data from the disc 10 in order to reproduce the recorded data.

The control unit 910 controls the recording/reading unit 920 so that data can be recorded in predetermined recording unit blocks. The control unit 910 also obtains valid data by processing data read by the recording/reading unit 920. In particular, according to aspects of the present invention, when a method of using the disc 10 changes, the control unit 910 controls the recording/reading unit 920, thereby rearranging the order of a first information structure with a variable size and a second information structure with a fixed size, both included in management information of the disc 10, so that the first information structure with the variable size can be placed following the second information structure with the fixed size, and then, the rearranged management information can be recorded to the disc 10. By way of example, the control unit 910 performs the rearranging described with reference to FIGS. 1 through 8 when the disc 10 is finalized.

Figure 10:
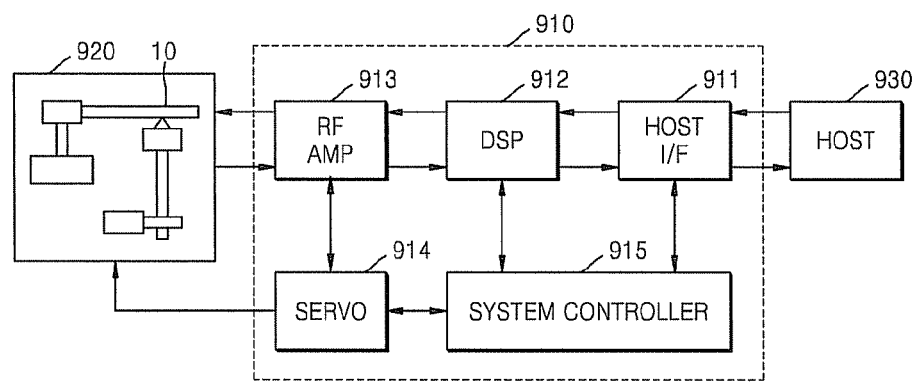
FIG. 10 is a detailed diagram of the recording and/or reproducing apparatus illustrated in FIG. 9 according to an embodiment of the present invention.

FIG. 10 is a detailed diagram of the recording and/or reproducing apparatus 900 illustrated in FIG. 9 according to an embodiment of the present invention. Referring to FIG. 10, a disc drive has a pickup as the recording/reading unit 920. A disc 10 is placed on the pickup. Also, as the control unit 910, the disc drive has a host interface (I/F) 911, a digital signal processor (DSP) 912, a radio frequency amplifier (RF AMP) 913, a servo 914, and a system controller 915.

While the disc 10 is used by recording data on the disc 10, if a user does not want to further record data on the disc 10, and wants to use the disc 10 only for reproduction of data, the user commands a host 930 to finalize the disc 10, and the host 930 transfers the finalization command to the system controller 915 through the host I/F 911.

The system controller 915 receives the finalization command from the host I/F 911 and performs finalization of the disc 10. In particular, according to an aspect of the present invention, when the information storage medium 10 is finalized, the order of SRRI 520 with a variable size and a TDDS 530 with a fixed size, both of which are included in the final TDMS 500 of the disc 10, is rearranged so that the SRRI 720 with the variable size can be placed following the TDDS 710 with the fixed size. The final TDMS 700 may be stored in a memory of the system controller 915 or may be recorded in a TDMA of the disc 10.

Then, the system controller 915 controls the DSP 912 and the servo 914 so that the rearranged TDMS 700 can be recorded in a DMS 600 of a DMA 112 of the disc 10. The DSP 212 adds additional data, such as a parity for error correction, to the data that is to be recorded, and performs error correction code (ECC) encoding, thereby generating an ECC block, and modulates the ECC block according to predetermined methods. The RF AMP 913 converts the data output from the DSP 912 into an RF signal. The pickup 920 records the RF signal output from the RF AMP 913 on the disc 10. The servo 914 receives a command required for servo control, from the system controller 915, and performs servo control.

When data is reproduced, the host I/F 911 receives a reproduction command from the host 930. The system controller 915 performs initialization required for the reproduction of the data.

The system controller 915 controls the recording/reading unit 920 so that recording management data recorded in a predetermined area of the disc 10 can be read. In particular, according to aspects of the present invention, when the disc 10 is finalized, the system controller 915 controls the recording/reading unit 920 so that SRRI 720 can be read from a location following a DDS 710 in a DMA 112 of the disc 10. Then, recording management information included in the read SRRI is confirmed, and according to the recording management information, the data recorded on the disc 10 is reproduced.

The pickup emits a laser beam onto the disc 10, receives the reflected laser beam from the disc, and outputs an optical signal thus obtained from the reflected laser beam. The RF AMP 913 converts the optical signal output from the pickup into an RF signal and provides modulated data obtained from the RF signal, to the DSP 912. Also, the RF AMP 913 provides a servo signal for control, obtained from the RF signal, to the servo 914. The DSP 912 demodulates the modulated data, performs ECC error correction of the data, and outputs the thus obtained data.

Meanwhile, the servo 914 receives the servo signal from the RF AMP 913 and the command required for servo control, from the system controller 915, and performs servo control for the pickup. The host I/F 911 transfers the data received from the DSP 912, to the host 930.

Figure 11:
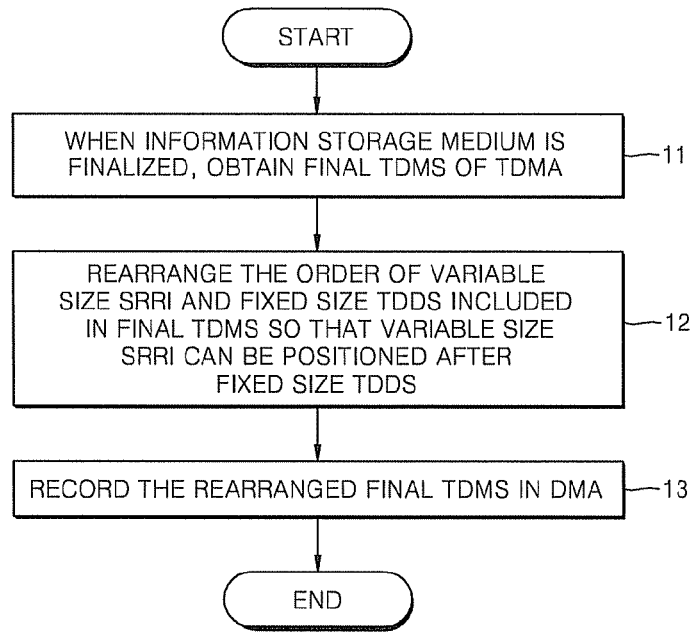
FIG. 11 is a flowchart illustrating operations of a method of recording data according to an embodiment of the present invention.

FIG. 11 is a flowchart illustrating operations of a method of recording data according to an embodiment of the present invention. While not required, aspects of the invention can implement all or part of the method using computer software or firmware encoded on a computer readable medium readable by a computer or processor, such as system controller 915.

Referring to FIG. 11, the control unit 910 of the recording and/or reproducing apparatus 900 obtains a final TDMS 500 of a TDMA 111 when an information storage medium 100 is finalized in operation 11. The control unit 910 rearranges the order of the SRRI 520 with a variable size and a TDDS 530 with a fixed size, both included in this final TDMS 500, so that the SRRI 720 with the variable size is placed following the TDDS 710 with the fixed size in operation 12.

The control unit 910 controls the recording/reading unit 920 so that the rearranged final TDMS 700 can be recorded in a DMA 112. That is, according to the control by the control unit 910, the SRRI 720 is recorded in a data frame following a data frame in which a DDS 710 is finally recorded in the DMA 112, and meaningless data (i.e., padding data 730) is recorded in the remaining data frames after recording the DDS 710 and SRRI 720 in the DMA 112.

FIG. 12 is a flowchart illustrating operations of a method of reproducing data according to an embodiment of the present invention. Referring to FIG. 12, the control unit 910 controls the recording/reading unit 920 so that SRRI 720 can be read from a location following a DDS 710 from a DMA 112 of a finalized information storage medium 100. Where the medium is not finalized, the SRRI 230, 420 is detected using the SRRI pointer 242, 431, of the TDDS 240, 430.

By referring to the read SRRI 720, the control unit 910 uses the information storage medium 100. That is, according to the contents of the SRRI 720, data is reproduced from the information storage medium 100.

According to aspects of the present invention as described above, recording management information can be found in a fixed location of a finalized information storage medium, thereby allowing the recording management information to be found easily and quickly. However, it is understood that aspects of the invention can be applied during other operations beyond finalization of the medium, and that aspects can be used with data structures having multiple variable sizes and/or fixed sizes without being limited to the SRRI, TDFL, and TDDS structures described herein by way of non-limiting examples.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Further aspects can be embodied in carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium comprising:
a user data area in which user data is recorded;
a first area having a first recording unit comprising first data, padding data, second data and third data which are recorded in an order of the first data with a variable size, the padding data to fill an unrecorded area, the second data with a variable size, and the third data with a fixed size, wherein the padding data precedes the second data, and the second data immediately precedes the third data; and
a second area other than the first area and having a second recording unit comprising a plurality of data frames in which a copy of the third data is recorded in a first data frame of the plurality of data frames, a copy of the second data is recorded in from a second data frame of the plurality of data frames, and the padding data is recorded in remaining data frames of the plurality of data frames in that order,
wherein:
the copies of the second and third data are to be used by a recording and/or reproducing apparatus to manage the user data recorded in the user data area; and
the first and second areas are other than the user data area, wherein the copy of the third data which is recorded in the second area comprises location information on the second data recorded in the first area.

2. A recording apparatus to record data on an information storage medium comprising a user data area in which user data is recorded, a first area and a second area other than the user data area and having a plurality of data frames, the apparatus comprising:
a pickup unit arranged to emit and/or receive light to transfer data with respect to the information storage medium; and
a controller arranged to control the pickup unit to record, in the first area, a first recording unit comprising first data, padding data, second data and third data which are recorded in an order of the first data with a variable size, the padding data to fill an unrecorded area, the second data with a variable size, and the third data with a fixed size, wherein the padding data precedes the second data, and the second data immediately precedes the third data, and to record, in the second area, a second recording unit comprising a plurality of data frames in which a copy of the third data is recorded in a first data frame of the plurality of data frames, a copy of the second data is recorded in from a second data frame of the plurality of data frames, and the padding data to fill an unrecorded area in that order, wherein the copy of the third data which is recorded in the second area comprises location information on the second data recorded in the first area.

3. An information storage medium comprising:
a user data area in which user data is recorded;
a first area having a Temporary Disc Management Structure (TDMS) comprising TDFL, padding data, SRRI and TDDS which are recorded in an order of the TDFL with a variable size, the padding data to fill an unrecorded area, the SRRI with a variable size, and the TDDS with a fixed size, wherein the padding data precedes the SRRI, and the SRRI precedes the TDDS; and
a second area other than the first area and having a Disc Management Structure (DMS) comprising a plurality of data frames in which a copy of the TDDS is recorded in a first data frame of the plurality of data frames, a copy of the SRRI is recorded in from a second data frame of the plurality of data frames, and the padding data is recorded in remaining data frames of the plurality of data frames in that order, wherein the copies of the SRRI and TDDS are to be used by a recording and/or reproducing apparatus to manage the user data recorded in the user data area, the first and second areas are other than the user data area, and wherein the TDMS and the DMS are a recording unit, respectively, wherein the copy of the TDDS which is recorded in the second area comprises location information on the SRRI recorded in the first area.

4. A recording apparatus to record data on an information storage medium comprising a user data area in which user data is recorded, a first area and a second area other than the user data area and having a plurality of data frames, the apparatus comprising:

a pickup unit arranged to emit and/or receive light to transfer data with respect to the information storage medium; and a controller arranged to control the pickup unit to record, in the first area, a Temporary Disc Management Structure (TDMS) comprising TDFL, padding data, SRRI and TDDS which are recorded in an order of the TDFL with a variable size, the padding data to fill an unrecorded area, the SRRI with a variable size, and the TDDS with a fixed size, wherein the padding data precedes the SRRI, and the SRRI precedes the TDDS, and to record, in the second area, a Disc Management Structure (DMS) comprising a plurality of data frames in which a copy of the TDDS is recorded in a first data frame of the plurality of data frames, a copy of the SRRI is recorded in from a second data frame of the plurality of data frames, and the padding data to fill an unrecorded area in that order, and wherein the TDMS and the DMS are a recording unit, respectively, wherein the copy of the TDDS which is recorded in the second area comprises location information on the SRRI recorded in the first area.

* * * * *